Figure 1:
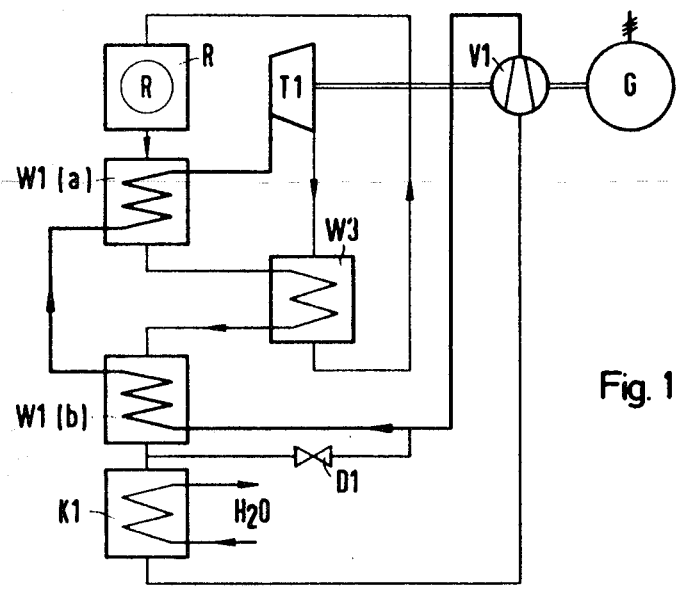

United States Patent

[11] 3,607,636

| [72] | Inventors | Jorg Nageler;<br>Hans-Peter Schabert, both of Erlangen, Germany |
|---|---|---|
| [21] | Appl. No. | 763,264 |
| [22] | Filed | Sept. 27, 1968 |
| [45] | Patented | Sept. 21, 1971 |
| [73] | Assignee | Siemens Aktiengesellschaft<br>Berlin, Germany |
| [32] | Priority | Sept. 29, 1967 |
| [33] | | Germany |
| [31] | | P 16 14 620.6 |

[54] NUCLEAR POWER STATION WITH $CO_2$ COOLING SYSTEM
8 Claims, 6 Drawing Figs.

[52] U.S. Cl. .................................................. 176/60, 60/59
[51] Int. Cl. .................................................. G21c 19/28
[50] Field of Search .......................................... 60/59, 59 T; 176/60

[56] References Cited
UNITED STATES PATENTS
3,377,800 4/1968 Spillmann ..................... 60/59
3,410,091 11/1968 Frutschi ........................ 176/60
3,444,038 5/1969 Schabert ....................... 176/60

*Primary Examiner*—Reuben Epstein
*Attorneys*—Curt M. Avery, Arthur E. Wilfond, Herbert L. Lerner and Daniel J. Tick ABSTRACT: Carbon dioxide cooling system for a nuclear power station producing electrical energy includes a gas turbine connected to a compressor and located upstream of the coolant gas inlet to the reactor, a regenerative heat exchanger connected in the coolant gas line between the compressor and the gas turbine, the primary loop of the regenerative heat exchanger being traversed by heated coolant issuing from the reactor either directly or after being relatively slightly reduced in pressure, the coolant further traversing a cooler connected in the primary loop, the coolant entering the compressor having a pressure within a range of at least 40 atma. and 130 atma., and further including means for supplying supplementary heat from the gas leaving the turbine to the high-pressure gas heated in the regenerative heat exchanger so as to increase the turbine inlet temperature and the entire efficiency therewith.

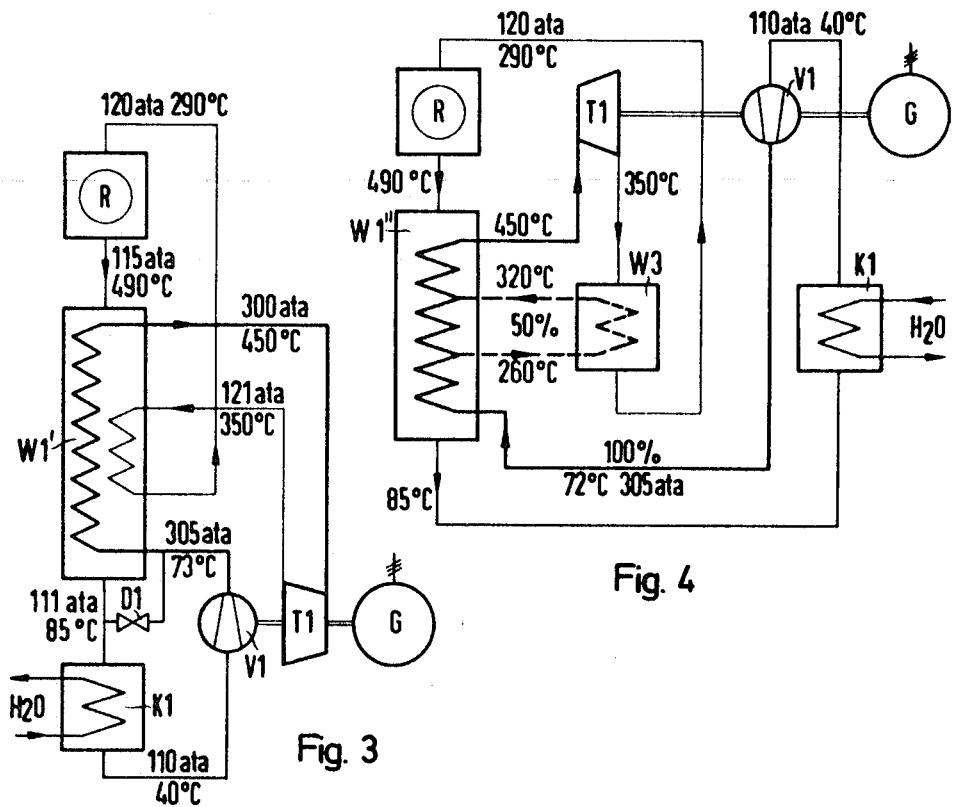
Fig. 3
Fig. 4
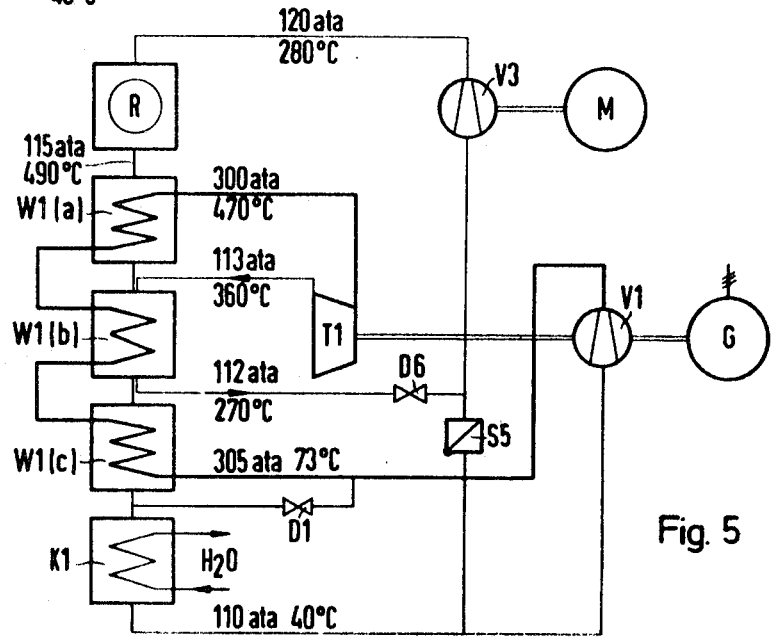
Fig. 5

NUCLEAR POWER STATION WITH CO₂ COOLING SYSTEM

Our invention relates to nuclear power station with CO cooling system for mainly producing electrical energy with the aid of gas turbines and constitutes an improvement over the power station of that general type described in the U.S. Pat. No. 3,444,038, issued May 13, 1969.

The power station of the just-mentioned copending application includes at least one gas turbine connected to a compressor and disposed upstream of the coolant gas inlet to the reactor, a regenerative heat exchanger connected in the coolant gas line between the compressor and the gas turbine, the primary loop of the regenerative heat exchanger being traversed by heated coolant issuing from the reactor either directly or after being relatively slightly reduced in pressure, the coolant further traversing a cooler connected in the primary loop, the coolant entering the compressor having a pressure within a range of at least 40 atmospheres absolute (atma.) and 130 (atma.). The gas turbine is thus located in the circulatory loop directly upstream of the coolant inlet to the reactor. The relatively high turbine inlet pressure of 300 atma., for example, produced in the compressor, only stresses the tubes of the heat exchanger. The degree range, i.e. the temperature difference, of the regenerative heat exchanger is relatively great, for example 95° C. at the hot end of the heat exchanger and only 12° C. at the cold end thereof, so that the operating medium enters the turbine at a lower temperature, compared to the case of a somewhat constant degree range over the entire heat exchanger surface. This varied gradation is a result of the sharply increased specific heat, in the lower temperature range of the $CO_2$ gas present under high pressure in the tubes. Due to this phenomenon, the efficiency is somewhat deteriorated or diminished. The problem then presents itself of reducing the mean degree range of the heat exchanger and thereby increasing the efficiency of the turbine, and it is accordingly an object of our invention to provide a solution for this problem.

With the foregoing and other objects in view, we provide in accordance with our invention carbon dioxide cooling system for a nuclear power station producing electrical energy comprising a gas turbine connected to a compressor and located upstream of the coolant gas inlet to the reactor, a regenerative heat exchanger connected in the coolant gas line between the compressor and the gas turbine, the primary loop of the regenerative heat exchanger being traversed by heated coolant issuing from the reactor either directly or after being relatively slightly reduced in pressure, the coolant further traversing a cooler connected in the primary loop, the coolant entering the compressor having a pressure within a range of at least 40 atma. and 130 atma., and further including means for supplying supplementary heat from the gas leaving the turbine to the high-pressure gas heat in the regenerative heat exchanger so as to increase the turbine inlet temperature and the entire efficiency therewith.

Other features which are considered as characteristic for the invention are set forth in the appended claims.

Although the invention is illustrated and described herein as embodied in nuclear power station with $CO_2$ cooling system, it is nevertheless not intended to be limited to the details shown, since various modifications and structural changes may be made therein without departing from the spirit of the invention and within the scope and range of equivalents of the claims.

Figure 6:
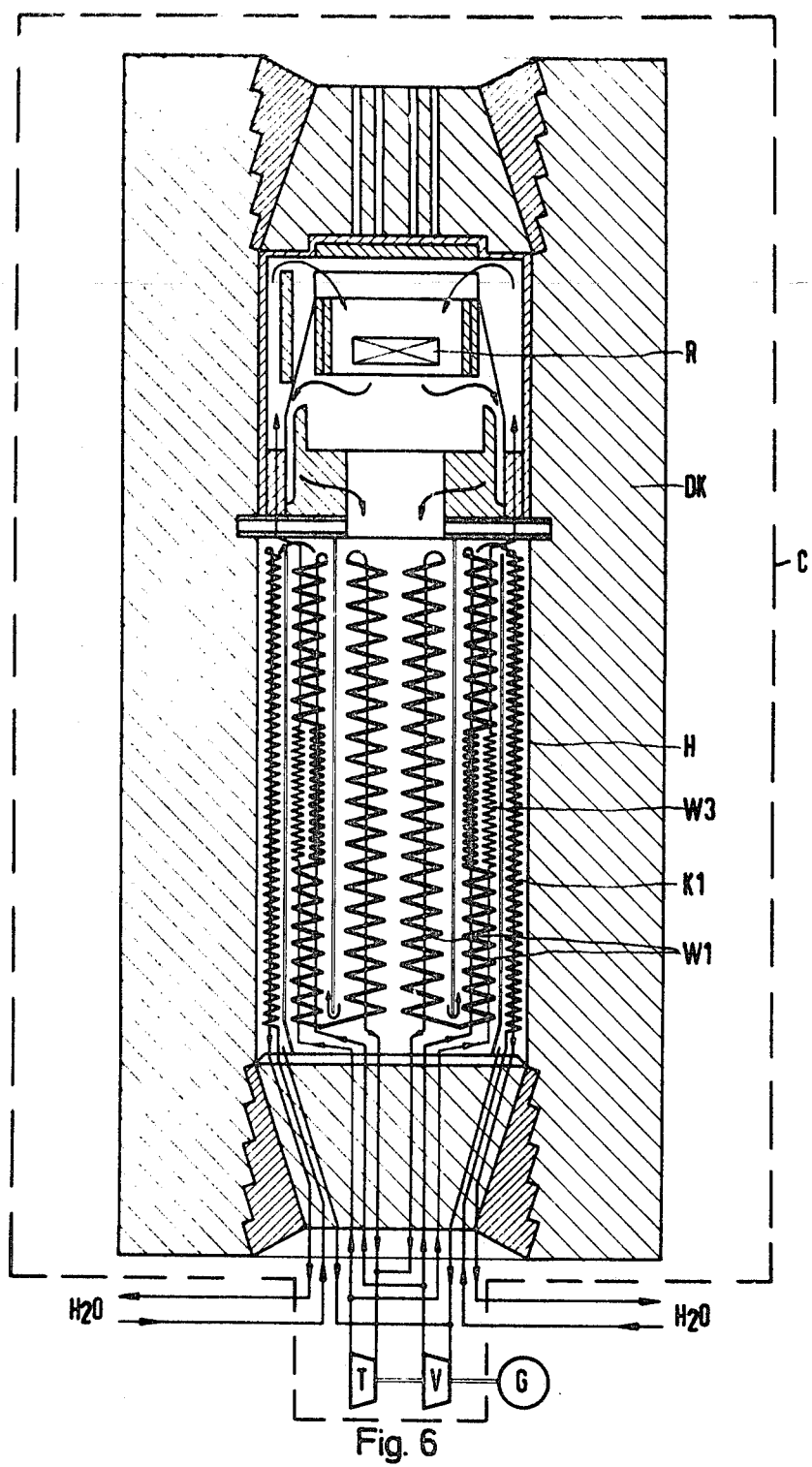

The construction and method of operation of the invention, however, together with additional objects and advantages thereof will be best understood from the following description of specific embodiments when read in connection with the accompanying drawings, in which:

FIGS. 1 to 5 are diagrammatic views of different embodiments of the carbon dioxide cooling system according to our invention; and FIG. 6 is a longitudinal sectional view through the nuclear power station of our invention showing diagrammatically the coordination of heat exchangers and reactor in a common pressure vessel.

The fundamental principle of adjusting the degree range is based on supplying auxiliary heat from the waste or spent gas of the turbine to the heat exchanger at a mean temperature level before the spent gas flows to the reactor. Consequently, when the heat exchanger is suitably dimensioned, the temperature level of the turbine is sharply increased whereas the reactor inlet temperature remains unchanged.

Like members are identified by the same reference characters in each of the figures of the drawing. These reference characters also correspond to those employed for the same components in $CO_2$ cooling system of the aforementioned copending application.

Referring now to the drawings and first particularly to FIG. 1 thereof, there is shown an embodiment of the $CO_2$ cooling system of our invention which includes a regenerative heat exchanger composed of two sections W1(a) and W1(b). Hot low-pressure gas flows from the nuclear reactor R through the heat exchanger section W1(b) and then through a special heat exchanger W3 heated by spent gas from the turbine T1 before passing through the second heat exchanger section W1(b).

Figure 2:
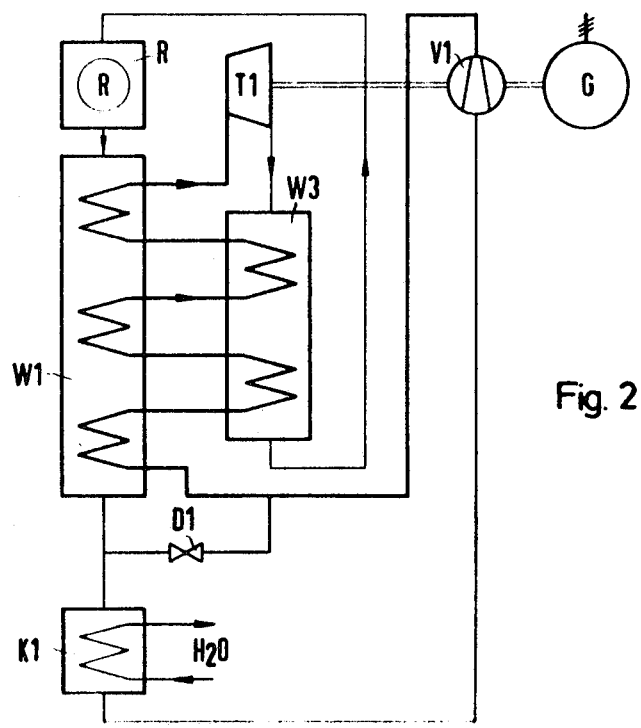

According to the embodiment of FIG. 2 the high-pressure side of a regenerative heat exchanger W1 is subdivided so that the high-pressure gas is conducted out of the heat exchanger w1 one or more times and additionally heated by spent gas from the turbine T1 in a heat exchanger W3. Consequently, the temperature difference or the degree range of the heat exchanger W1 is reduced on an average and the turbine inlet temperature is thereby increased.

In the embodiment of FIG. 3, the separate heat exchangers W1 and W3 of the previously described embodiments are combined into a single structural unit W1'. Spent gas at about 350° C. and 121 atma. flowing from the turbine T1 is conducted through heat exchanger coils or surfaces in the heat exchanger W1' and thereby through the low pressure gas flowing in the same direction within the exchanger W1' from the reactor R, heats the high-pressure gas flowing in the opposite direction through the main heating coils or surfaces contained in the heat exchanger W1'. The operating data, i.e. the temperatures and pressures, shown in FIG. 3, and in FIGS. 4 and 5 as well, also applying analogously to the embodiments of FIGS. 1 and 2.

The auxiliary heating of the high-pressure gas flowing to the turbine T1 can also be effected by the embodiment of FIG. 4 wherein a partial flow of the high-pressure gas, i.e. about 50 percent thereof, is diverted from the high-pressure surfaces or coils in the heat exchanger W1'' and conducted through a heat exchanger W3. The partial flow of high-pressure gas is heated by spent gas from the turbine T1 in the exchanger W3 from about 260° C. to about 320° C. and thereafter returned to the high-pressure coils or heating surfaces of the heat exchanger W1''. The diversion or branching of the desired amount of the partial flow of high-pressure gas from the heat exchanger W1'' to the heat exchanger W3 can be regulated by providing conventional adjustable throttling valves or the like (not shown) in the lines connecting the heat exchangers W1'' and W3.

FIG. 5 shows a further variant in the structure of our invention which utilizes the spent gas heat of the turbine T1. In this embodiment, the spent gas, at a pressure of about 113 atma. and temperature of about 360° C., is mixed with a low-pressure primary gas flow coming from the reactor R at a location at which the mixed gases have the same temperature. After these mixed gases have been cooled to about 270° C., they are again removed and are passed to the reactor R at an increased pressure of 120 atma. through one or several parallel-connected circulating blowers or ventilators V3. The regenerative heat exchanger is divided, in the embodiment of FIG. 5, into three parts W1(a), W1(b) and W1(c) which can however, naturally, have an integral construction as viewed from the exterior. The valve D6 is normally open. In the event of a failure or breakdown of the turbine T1 and the compressor V1, the aftercooling or emergency cooling of the reactor can be effected by closing of the armature D6 and further independent operation of the circulating blower or ventilator V3. The check valve S5 thereby opens automatically. Besides the above-described and illustrated embodiments of FIGS. 1–5, obviously, other possible constructions are conceivable for returning the heat of the spent gas from the turbine.

As can be noted from FIG. 1 of the aforementioned copending application, heat exchangers and coolers can be connected together with the reactor proper in a common pressure vessel. FIG. 6 of the instant application illustrates as an example a longitudinal section through a construction of this type wherein nuclear reactor R is a fast breeder reactor. The pressure vessel DK is produced from prefabricated stress concrete portions of the type conventionally known in the literature and in the respective art. The remaining components of the nuclear reactor installation are shown diagrammatically by the conventional symbols therefor outside the physical structure of the pressure vessel DK in order to better comprehend the flow path of the coolant gas.

Turbines and compressors, as aforementioned, are thus located outside of the pressure seal but nevertheless still within the reactor safety structure of containment vessel C, as represented by the dotted lines in FIG. 6. The generators and coolant water circulating loop are located, however, outside of the container vessel C. The coolant gas coming out of the reactor at the top thereof, as shown in FIG. 6, has a pressure of about 110 atma. and a temperature of 490° C. It flows initially in the middle of the vessel downward over part of the heat exchanger tubes of the regenerative heat exchanger W1. The low-pressure gas then rises, guided by guiding plates or vanes, thereafter in an annular zone in an upward direction past further tube bundles of the heat exchanger W1, between which other tube bundles W3 for returning the spent gas heat (the turbine discharge gas at a pressure of 120 atma.) are located. In the outer annular zone, the gas then flows downward once again and is cooled back to about 40° C. by the tube bundles of the cooler K1 which are traversed by water. By this special guidance of the coolant gas it is possible to dispense in various regions with inner insulation which is conventionally expensive in concrete reactor pressure vessels, whereby the water cooling of the inner dense surface layer of the pressure vessel DK simultaneously forms part of the cooling system K1. The tube lines preferably extend through the lower displaceable conical stopper of the pressure vessel since it lends itself particularly well for this purpose. The tubular bundles of the individual heat exchangers are obviously combined into groups in a conventional manner which are connected to one another by collectors or manifolds and by equalizing or compensating chambers. These latter structural features which are well known in the art have not been illustrated in the drawing to avoid obliterating essential details of the invention.

It is noted in this regard that the heat exchanger, for example, can be constructed as helical tube bundles having the same gradient angle at each location.

If several parallel-connected compressors are employed for safety sake, each of the compressors can be coordinated in the interior of the pressure vessel with one collector or manifold, and the individual coil tubes can be distributed uniformly connected to the collectors or manifolds, so that no strings of hot or cold gas can be formed on the low-pressure side of the heat exchanger in the event of a breakdown of individual compressors. To improve the heat transfer, it can accordingly be advantageous to provide the inner and/or outer surfaces of the tubes with circular or helical ribs or the like.

In summary, it is noted that for the nuclear reactor installation of the invention disclosed in the instant application, in the same manner as for the installation of the aforementioned copending application, it is possible to provide a splitting of the coolant gas stream flowing from the nuclear reactor into two or more parallel circulatory loops, which offers advantages particularly also for carrying out a partial load operation.

With respect to emergency cooling of such a nuclear reactor installation, the point of view expressed in the copending application Ser. No. 755,008 of E. Harand and H. P. Schabert, entitled Gas Turbine Installation for Nuclear Power Plant, filed on Aug. 23, 1968, and assigned to the assignee of the present invention, are similarly applicable to the present invention.

If it should occur that coolant medium is present in the reactor having a temperature lower than the reactor outlet temperature then, obviously, the heat content thereof can be increased to the corresponding temperature level for improving the entire efficiency of the regenerator heat exchanger. Such heat quantities can be freed, for example in the moderator or heavy water moderated $CO_2$-cooled reactor or in the radial breeder blanket of a $CO_2$-cooled fast breeder reactor.

We claim:

1. Carbon dioxide cooling system for a nuclear power station producing electrical energy, comprising a primary coolant loop including at least one gas turbine and a compressor connected thereto, both said turbine and said compressor being located upstream of a coolant gas inlet to the nuclear reactor of the power station, a regenerative heat exchanger having a first flow path connected in said primary coolant loop between the outlet of said compress at inlet to said turbine, and a second flow path connected to a coolant gas outlet of the nuclear reactor, a cooler connected in said primary loop between the second flow pat of said regenerative heat exchanger and the inlet of said compressor, carbon dioxide coolant gas traversing said primary loop and having a pressure at the inlet to said compressor relatively slightly less than the pressure thereof at the coolant gas outlet of the nuclear reactor and within a range of at least 40 to 130 atmospheres absolute, and means connected between the outlet of said turbine and the inlet to the nuclear reactor for supplying supplementary heat from the gas leaving said turbine to the gas in said first coolant flow path being heated in said regenerative heat exchanger so as to increase the gas temperature at the inlet to said turbine, whereby the entire efficiency of the station is increased.

2. Cooling system according to claim 1, wherein said supplementary heating means comprises an additional heat exchanger traversible by spent gas from said turbine outlet, and said regenerative heat exchanger has at least two sections, said first coolant flow path of the first of said heat exchange sections being connected to said additional heat exchanger so that partly cooled gas in said first coolant flow path of said first section is afterheated in said additional heat exchanger.

3. Cooling system according to claim 2, wherein said supplementary heating means comprises an additional heat exchanger traversible by spent gas from said turbine outlet, and said regenerative heat exchanger includes a plurality of stages of said first coolant flow path at different temperatures connected with said additional heat exchanger and traversible by part of the gas flowing through said first coolant flow path so that the gas in said respective stages is afterheated in said additional heat exchanger.

4. Cooling system according to claim 2, wherein said supplementary heating means comprises an additional heat exchanger traversible by spent gas from said turbine outlet, and said regenerative heat exchanger includes a plurality of stages of said first coolant flow path at different temperatures connected with said additional heat exchanger and traversible by all of the gas flowing through said first coolant path so that the gas in the respective stages is afterheated in said additional heat exchanger.

5. Cooling system according to claim 1, wherein said supplementary heating means is connected in a third flow path between said turbine outlet and the inlet to the nuclear reactor, and includes heat exchanger surfaces located in said regenerative heat exchanger so as to heat the coolant gas in the first coolant flow path of said regenerative heat exchanger.

6. Cooling system according to claim 2, wherein said regenerative heat exchanger has at least three stages, and said supplementary heating means comprises a conduit connecting said turbine outlet with the second flow path in an intermediate stage of said regenerative heat exchanger and a compressor connected between said second flow path of said intermediate stage and the inlet to the reactor.

7. Cooling system according to claim 1 wherein said regenerative heat exchanger has a plurality of stages, and including a pressure vessel, said reactor, said heat exchanger and said cooler being all located within said pressure vessel, said heat exchanger stages being disposed coaxially to said pressure vessel and one another, and said cooler being disposed in a radially outermost zone of said pressure vessel.

8. Cooling system according to claim 1 wherein said supplementary heating means is an additional heat exchanger, and including a pressure vessel, said reactor, said regenerative and additional heat exchangers and said cooler being all located within said pressure vessel, said heat exchangers being disposed coaxially to said pressure vessel and one another, and said cooler being disposed in a radially outermost zone of said pressure vessel.